US009857811B2

(12) United States Patent
Ker et al.

(10) Patent No.: US 9,857,811 B2
(45) Date of Patent: Jan. 2, 2018

(54) PROGRAMMABLE QUICK DISCHARGE CIRCUIT AND METHOD THEREOF

(71) Applicant: National Chiao Tung University, Hsinchu (TW)

(72) Inventors: Ming-Dou Ker, Hsinchu (TW); Wan-Hsueh Cheng, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 309 days.

(21) Appl. No.: 14/616,201

(22) Filed: Feb. 6, 2015

(65) Prior Publication Data

US 2016/0233688 A1 Aug. 11, 2016

(51) Int. Cl.
*H02J 7/00* (2006.01)
*G05F 1/00* (2006.01)

(52) U.S. Cl.
CPC .................................... *G05F 1/00* (2013.01)

(58) Field of Classification Search
CPC .................................................... H02J 7/355
USPC ................................................ 320/166, 167
See application file for complete search history.

(56) References Cited

U.S. PATENT DOCUMENTS 5,309,399 A * 5/1994 Murotani ............... G11C 5/147 327/530
2013/0002209 A1* 1/2013 Voegele .................. H02M 1/32 320/166

* cited by examiner

*Primary Examiner* — Edward Tso
*Assistant Examiner* — Ahmed Omar
(74) *Attorney, Agent, or Firm* — Mintz Levin Cohn Ferris Glovsky and Popeo, P.C.; Peter F. Corless; Steven M. Jensen

(57) ABSTRACT

A programmable power discharge circuit and a method of discharging power are provided. The programmable power discharge circuit includes a programmable voltage controller, a detect circuit, and a discharge circuit. The programmable voltage controller selects and provides a threshold voltage by a voltage divider including a plurality of impedance components. The detect circuit detects a difference between the threshold voltage and a working voltage to decide whether the working voltage is discharged.

11 Claims, 5 Drawing Sheets

200

PROGRAMMABLE QUICK DISCHARGE CIRCUIT AND METHOD THEREOF

FIELD OF THE INVENTION

The invention is about discharge circuits. To be more specific, the invention is about a programmable quick discharge circuit and a method of discharging power.

DESCRIPTION OF RELATED ART

In the application of a power supply, a circuit inside a voltage regulator is usually provided with a capacitor having huge capacitance, so as to obtain a nice load regulation rate and low ripple. However, when the power supply is powered off, the output capacitor is equivalent to a parallel huge capacitor, and thus the voltage of the capacitor drops quite slowly. As such, even if the power supply is powered off, the capacitor still continuously outputs a voltage for a long time until the power stored thereon is discharged. Therefore, when the power supply is powered on next time, a power-on reset circuit may not be successfully activated by a control chip inside the circuit due to that the voltage may still remain in the capacitor, thereby resulting in an operation error.

In order to discharge the power stored in the capacitor in the circuit inside the voltage regulator when the power supply is powered off, a capacitor discharge circuit is usually employed in the art. With the discharge circuit, once the voltage of the power supply is less than to a threshold voltage, the power stored in the capacitor in the circuit inside the voltage regulator can be discharged through the discharge circuit. However, the conventional discharge circuit only provides a predetermined threshold voltage, such that if the threshold voltage needs to be adjusted, transistors or resistors in the discharge circuit have to be replaced to satisfy the desired threshold voltage. This not only increases the cost, but also brings great inconvenience.

Accordingly, how to find a way to provide a programmable quick discharge circuit, which not only quickly discharges the power stored in the capacitor in the circuit inside the voltage regulator when an AC power source is powered off, but also allows a user to conveniently adjust the threshold voltage for activating the quick discharge circuit becomes the objective being pursued by persons skilled in the art.

SUMMARY OF THE INVENTION

Given abovementioned defects of the prior art, the present invention provides a programmable discharge circuit to conveniently adjust the threshold voltage for activating the quick discharge circuit.

In order to achieve abovementioned and other objectives, the present invention provides a programmable power discharge circuit, comprising: a programmable voltage controller, a detect circuit, and a discharge circuit. The programmable voltage controller selects and provides a threshold voltage by a voltage divider including a plurality of impedance components. The detect circuit detects a difference between the threshold voltage and a working voltage to decide whether the working voltage is discharged. The discharge circuit includes a MOS transistor and a resistor-capacitor (RC) circuit, and discharges the working voltage when the working voltage is less than the threshold voltage.

In an embodiment, the programmable voltage controller selects and provides a threshold voltage by a voltage divider including a plurality of impedance components.

The present invention also provides a method of discharging power, comprising: selecting a threshold voltage, detecting a difference between the threshold voltage and a working voltage, and discharging the working voltage when the working voltage is less than the threshold voltage.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

In the following, specific embodiments are provided to illustrate the detailed description of the present invention. Those skilled in the art can easily conceive the other advantages and effects of the present invention, based on the disclosure of the specification. The present invention can also be carried out or applied by other different embodiments.

Figure 1:
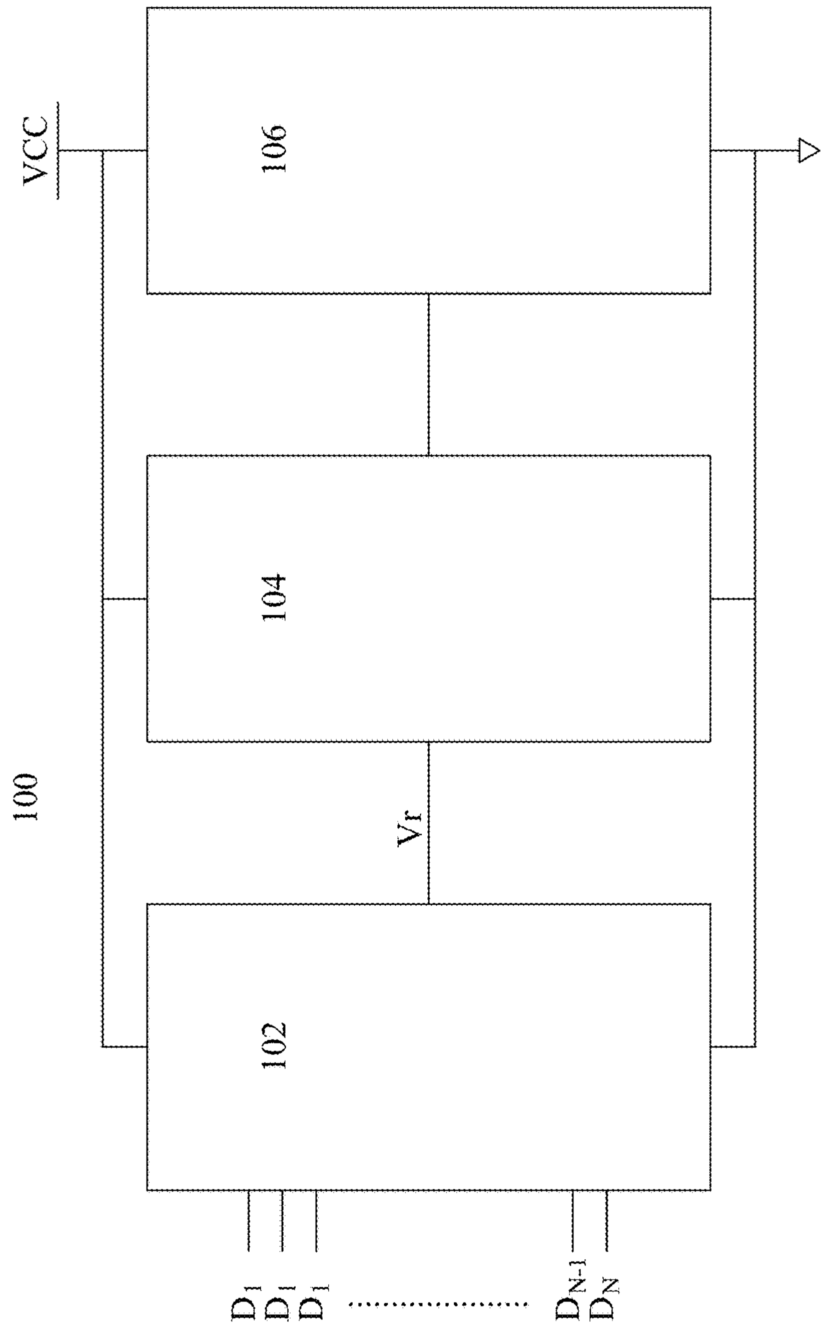
FIG. 1 is a system structure view of a programmable power discharge circuit according to the present invention.

As shown in FIG. 1, a system structure view of a programmable power discharge circuit 100 according to the present invention is provided. The programmable power discharge circuit 100 comprises a programmable voltage controller 102, a detect circuit 104 electrically connected to the programmable voltage controller 102, and a discharge circuit 106 electrically connected to the detect circuit 104. The programmable voltage controller 102 has N threshold voltages that can be selected by a user through a selector with N bits $D_1$ to $D_N$. A selected threshold voltage $V_r$ is then utilized by the detect circuit 104 to compare with a working voltage VCC provided by, for example, a power supply, such that the discharge circuit 106 is activated when it is detected that the working voltage VCC is less than the selected threshold voltage $V_r$. Once the discharge circuit 106 is activated, a discharge path is provided to the working voltage VCC, so as to quickly discharge the working voltage VCC of the power supply until the working voltage VCC drops to 0 volt.

Figure 2:
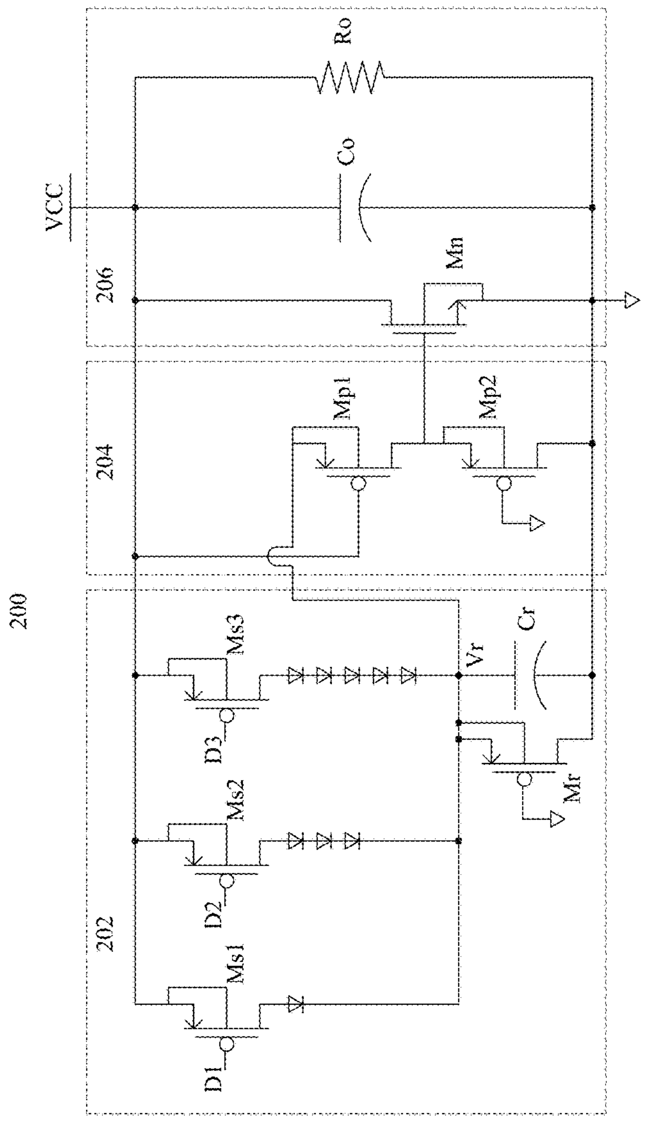
FIG. 2 is a scheme view of the programmable power discharge circuit according to an embodiment of the present invention.

FIG. 2 is a scheme view of a programmable power discharge circuit 200 according to an embodiment of the present invention. As shown in FIG. 2, the programmable power discharge circuit 200 comprises a programmable voltage controller 202, a detect circuit 204 and a discharge circuit 206. In this embodiment, the programmable voltage controller 202 is implemented by a voltage divider, for example. The voltage divider includes three charging paths having a PMOS switch transistor and a group of impedance component(s) such as diode(s) in series and a second RC circuit. In an embodiment, switch transistors $M_{s1}$ to $M_{s3}$ are controlled by a selector with three bits $D_1$ to $D_3$, such that only one switch transistor is on to select the group of diode(s) for charging a reference capacitor $C_r$ of the second RC circuit to reach the threshold value.

Typically, the voltage drop of one diode is about 0.7 volt, such that the number of the diode(s) can determine the threshold voltage $V_r$. For example, the threshold voltage determined by one diode is approximately VCC-0.7 volt, which should be higher than the threshold value determined by five diodes, which is approximately VCC-3.5 volt, since each diode provides a voltage drop. Also, it should be appreciated that the bits of the selector and corresponding number of the charging paths is not limited to three, and can be modified upon the actual need. In addition, the PMOS transistors employed herewith can be replaced with NMOS transistors and the NMOS transistor can also be replaced with PMOS transistor through a suitable modification, such modification is conceivable to persons skilled in the art and thus is omitted.

In an embodiment, the detect circuit includes two PMOS transistors $M_{p1}$ and $M_{p2}$, such that when the working voltage VCC is less than the selected threshold voltage $V_r$, the source of the transistor $M_{p2}$ provides a voltage sufficient to activate the discharge circuit 206.

The discharge circuit 206 includes a NMOS transistor $M_n$ and a first RC circuit having an output capacitor $C_o$ coupled to an equivalent resistor. For example, as shown in FIG. 2, a resistor $R_o$ is presented to simulate an equivalent resistor of a standby power when an AC power source is powered off and the circuit is not in operation. Accordingly, it should be appreciated that the output capacitor $C_o$ is not limited to be coupled to the resistor $R_o$, but can be coupled to any suitable equivalent resistor to discharge the power. Therefore, when the power supply normally provides power, the NMOS transistor $M_n$ is switched off to avoid consuming additional power. When the power supply is powered off, the working voltage VCC drops slowly, and once the working voltage VCC is less than the reference voltage $V_r$, the NMOS transistor $M_n$ is switched on to activate the discharge circuit 206, so as to quickly discharge the working voltage VCC of the power supply until the working voltage VCC drops to 0 volt.

In an embodiment, the second RC circuit includes the reference capacitor $C_r$ and a PMOS resistor $M_r$ in parallel. Preferably, a RC constant of the first RC circuit, i.e., the resistance of the equivalent resistor coupled to the output capacitor $C_o$ times the capacitance of the output capacitor $C_o$, is smaller than a RC constant of the second RC circuit, i.e., the equivalent resistance of the PMOS resistor $M_r$ times the capacitance of the reference capacitor $C_r$. Therefore, when the working voltage VCC is less than the reference voltage $V_r$, the discharging speed of the second RC circuit is slower than the first RC circuit, so as to continuously provide a relatively high voltage to keep the discharge circuit 206 in activation.

The properties of electronic components such as transistors, resistors and capacitors can be selected by persons skilled in the art upon the actual need. For example, the switch transistors $M_{s1}$ to $M_{s3}$ and the PMOS transistor $M_{p1}$ may be PMOS transistors having a width/length (W/L) ratio of 10μ/0.5μ, the PMOS transistor $M_{p2}$ may have a W/L ratio of 0.3μ/5μ, the NMOS transistor $M_n$ may have a W/L ratio of 1000μ/0.5μ, the output capacitor $C_o$ may be 10 μF, the reference capacitor $C_r$ may be 5 μF, and the MOS resistor $M_r$ may include at least two, such as six, serially connected PMOS transistors each having a W/L ratio of 0.3μ/20μ.

Figure 3:
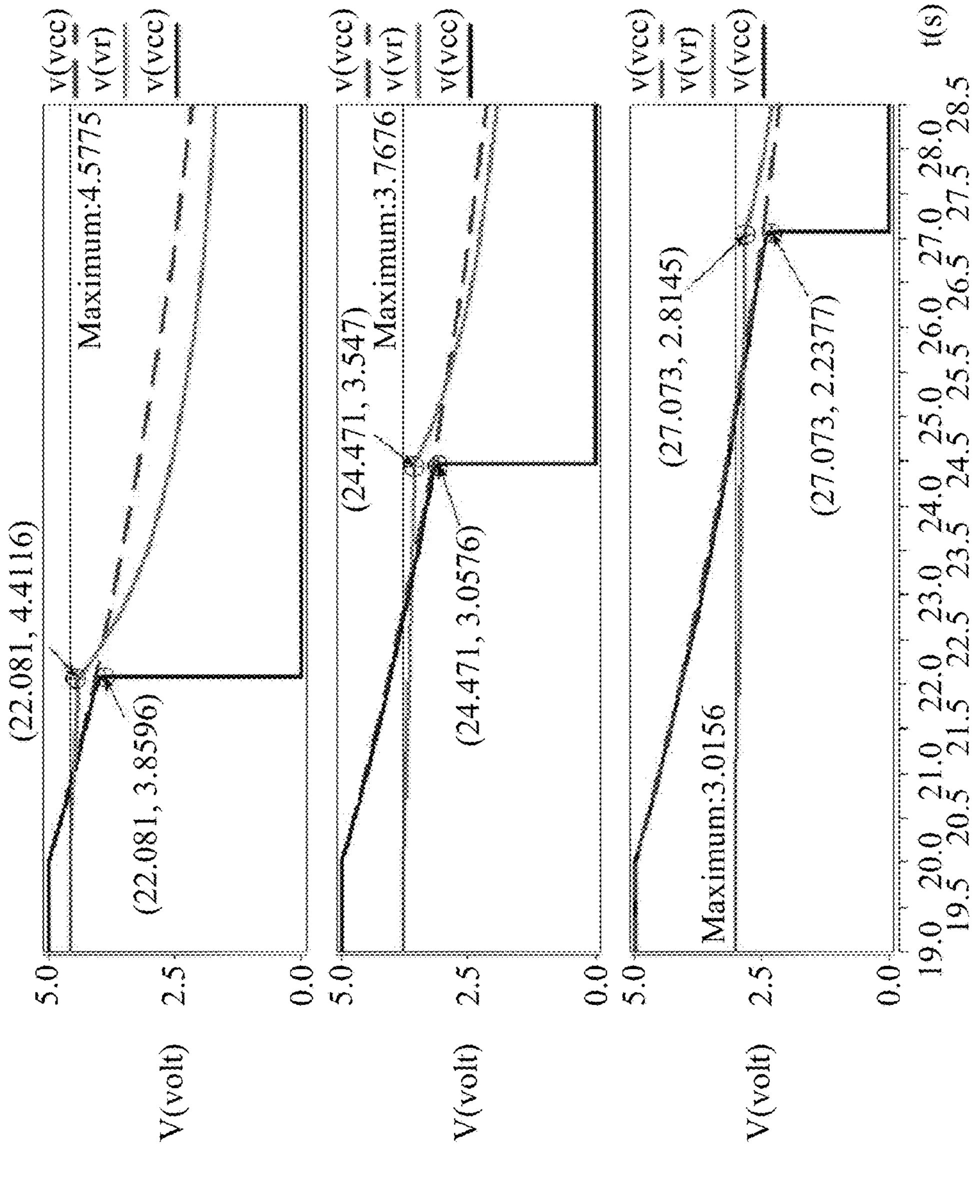
FIG. 3 is a simulation graph illustrating a simulation result of the programmable power discharge circuit shown in FIG. 2.

FIG. 3 is a simulation graph illustrating a simulation result of the programmable power discharge circuit shown in FIG. 2, in which three scenarios corresponding to the selections of the three charging paths of the programmable voltage controller 202 shown in FIG. 2, respectively. Scenario (a) refers to the charging path controlled by the bit $D_1$, where only one diode is arranged. It can be seen that the maximum of the threshold voltage $V_r$ is about 4.57 volt, such that when the working voltage VCC drops to 3.85 volt which is about 0.5 volt below the reference voltage $V_r$, the NMOS transistor $M_n$ is switched on to discharge the working voltage VCC to 0 volt. Also, since the RC constant of the first RC circuit is smaller than the RC constant of the second RC circuit, the threshold voltage discharged by the second RC circuit drops significantly slower than the working voltage VCC discharged by the first RC circuit, so as to keep the discharge circuit 206 in activation. Similarly, scenario (b) refers to the charging path controlled by the bit $D_2$, where three diodes are arranged. It can be seen that the maximum of the threshold voltage $V_r$ is about 3.76 volt, such that when the working voltage VCC drops to 3.05 volt which is about 0.5 volt below the reference voltage $V_r$, the NMOS transistor $M_n$ is switched on to discharge the working voltage VCC to 0 volt. Further, scenario (c) refers to the charging path controlled by the bit $D_3$, where five diodes are arranged. It can be seen that the maximum of the threshold voltage $V_r$ is about 3.01 volt, such that when the working voltage VCC drops to 2.23 volt which is about 0.5 volt below the reference voltage $V_r$, the NMOS transistor $M_n$ is switched on to discharge the working voltage VCC to 0 volt.

In addition, the dashed line in the simulation graph of FIG. 3 represents the working voltage VCC without using the programmable power discharge circuit of the present invention. A comparison of abovementioned three scenarios and the scenario without using the programmable power discharge circuit is provided in the Table 1 below. Apparently, the working voltage VCC without using the programmable quick power discharge circuit drops much slower than that in the scenarios (a) to (c).

TABLE 1

| Scenarios | Duration time<br>Required time for voltage VCC discharging from 5 volt to 0.5 volt |
|---|---|
| Without using a quick discharge circuit | 23 sec |
| D1 = 0, D2 = 1, D3 = 1 | 2 sec |
| D1 = 1, D2 = 0, D3 = 1 | 4.5 sec |
| D1 = 1, D2 = 1, D3 = 0 | 7 sec |

Figure 4:
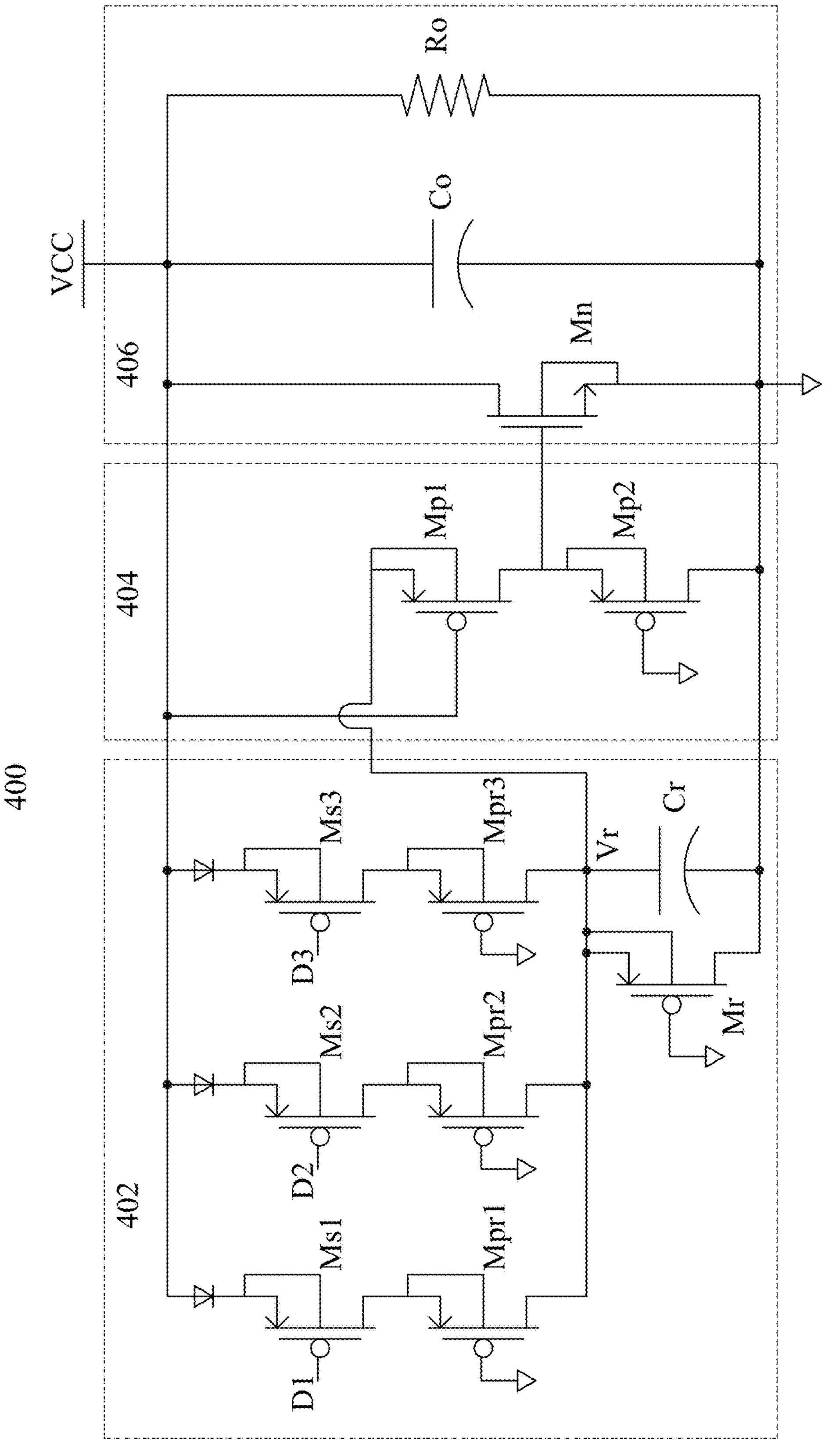
FIG. 4 is a scheme view of the programmable power discharge circuit according to an embodiment of the present invention.

FIG. 4 is a scheme view of the programmable power discharge circuit according to an embodiment of the present invention. As shown in FIG. 4, the programmable power discharge circuit 400 comprises a programmable voltage controller 402, a detect circuit 404 and a discharge circuit 406. In this embodiment, the diodes shown in FIG. 2 are replaced with MOS resistors $M_{pr1}$ to $M_{pr3}$ providing different equivalent resistances, such that the working voltage VCC is divided by a selected MOS resistor $M_{pr1}$, $M_{pr2}$ or $M_{pr3}$ with the MOS resistor $M_r$ to determine the threshold voltage $V_r$.

Accordingly, when the power supply normally provides power, the reference capacitor $C_r$ is charged through the charging path determined by the bits $D_1$ to $D_3$ of the selector to reach the threshold voltage $V_r$, and the reference capacitor $C_r$ is prevented from discharging. Also, when the power supply normally provides power, the NMOS transistor $M_n$ is switched off to avoid consuming additional power. When the power supply is powered off, the working voltage VCC drops slowly, and once the working voltage VCC is less than the reference voltage $V_r$, the NMOS transistor $M_n$ is switched on to activate the discharge circuit 406, so as to quickly discharge the working voltage VCC of the power supply until the working voltage VCC drops to 0 volt.

Figure 5:
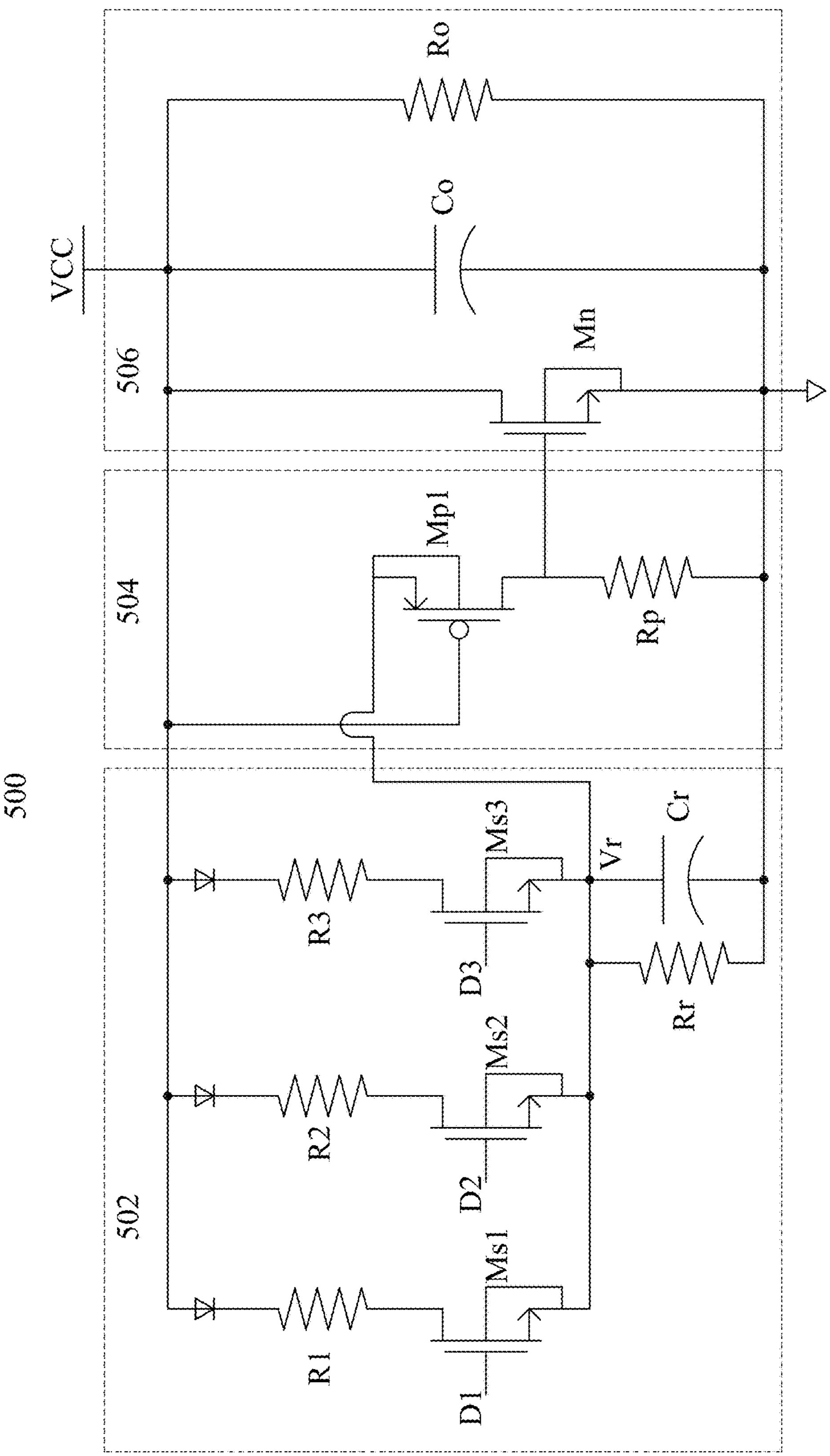
FIG. 5 is a scheme view of the programmable power discharge circuit according to an embodiment of the present invention.

FIG. 5 is a scheme view of the programmable power discharge circuit according to an embodiment of the present invention. As shown in FIG. 5, the programmable power discharge circuit 500 comprises a programmable voltage controller 502, a detect circuit 504 and a discharge circuit 506. In this embodiment, the MOS resistors $M_{pr1}$ to $M_{pr3}$ shown in FIG. 4 are replaced with resistors $R_1$ to $R_3$ having different resistances and the MOS resistor $M_r$ shown in FIG. 4 is replaced with a reference resistor $R_r$, such that the working voltage VCC is divided by a selected resistor $R_1$, $R_2$ or $R_3$ with the reference resistor $R_r$ to determine the threshold voltage $V_r$. Moreover, the PMOS transistor $M_{p2}$ shown in FIG. 4 is also replaced with a resistor $R_p$, such that when the PMOS transistor $M_{p1}$ is switched on, a current will flow through the resistor $R_p$ and provide a voltage sufficient to switch on the NMOS transistor $M_n$.

Accordingly, when the power supply normally provides power, the reference capacitor $C_r$ is charged through the charging path determined by the bits $D_1$ to $D_3$ of the selector to reach the threshold voltage $V_r$, and the reference capacitor $C_r$ is prevented from discharging. Also, when the power supply normally provides power, the NMOS transistor $M_n$ is switched off to avoid consuming additional power. When the power supply is powered off, the working voltage VCC drops slowly, and once the working voltage VCC is less than the reference voltage $V_r$, the NMOS transistor $M_n$ is switched on to activate the discharge circuit 506, so as to quickly discharge the working voltage VCC of the power supply until the working voltage VCC drops to 0 volt.

From the foregoing, the present invention provides a programmable quick discharge circuit and method thereof, which not only quickly discharge the power stored in the capacitor in the circuit inside the voltage regulator when an AC power source is powered off, but also allow a user to conveniently adjust the threshold voltage for activating the quick discharge circuit.

The above examples are only used to illustrate the principle of the present invention and the effect thereof, and should not be construed as to limit the present invention. The above examples can all be modified and altered by those skilled in the art, without departing from the spirit and scope of the present invention as defined in the following appended claims.

What is claimed is:

1. A programmable power discharge circuit, comprising:
a programmable voltage controller that selects and provides a threshold voltage;
a detect circuit that is electrically connected to the programmable voltage controller and detects a difference between the threshold voltage and a working voltage; and
a discharge circuit that is electrically connected to the detect circuit and discharges the working voltage when the working voltage is less than the threshold voltage,
wherein the discharge circuit includes a MOS transistor and a first resistor-capacitor (RC) circuit, and
the programmable voltage controller comprises a voltage divider that divides the working voltage and a second resistor-capacitor (RC) circuit serially connected to the voltage divider.

2. The programmable power discharge circuit of claim 1, wherein the voltage divider includes a plurality of different impedance components, each of the impedance components determining a different value of the threshold voltage, and the second RC circuit is serially connected to the impedance components.

3. The programmable power discharge circuit of claim 2, wherein each of the impedance components includes a switch and a different number of diode(s).

4. The programmable power discharge circuit of claim 2, wherein each of the impedance components includes a switch and a MOS resistor that is serially connected to the switch and has a different resistance from remaining ones of the impedance components.

5. The programmable power discharge circuit of claim 1, wherein the second RC circuit includes a MOS resistor having at least two serially connected P-MOS transistors.

6. The programmable power discharge circuit of claim 2, wherein each of the impedance components includes a switch and a resistor that is serially connected to the switch and has a different resistance from remaining ones of the impedance components.

7. The programmable power discharge circuit of claim 1, wherein the second RC circuit has an RC constant smaller than an RC constant of the first RC circuit.

8. The programmable power discharge circuit of claim 1, wherein the detecting circuit includes two serially connected P-MOS transistors.

9. The programmable power discharge circuit of claim 1, wherein the detecting circuit includes a P-MOS transistor and a resistor serially connected to the P-MOS transistor.

10. The programmable power discharge circuit of claim 1, wherein the MOS transistor of the discharge circuit is an N-MOS transistor.

11. A method of discharging power, comprising:
selecting a threshold voltage;
detecting a difference between the threshold voltage and a working voltage; and
discharging the working voltage when the working voltage is less than the threshold voltage,
wherein discharging the working voltage comprises manipulating RC constants of an RC circuit of a programmable voltage controller and an RC circuit of a discharge circuit.

* * * * *